Aug. 22, 1967   R. SCHEPT   3,337,829
CORE AIR GAP HAVING TEMPERATURE INSENSITIVE SPACER THEREIN
Filed Dec. 7, 1965

INVENTOR.
ROBERT SCHEPT
BY
Roger W. Jensen
ATTORNEY 3,337,829
CORE AIR GAP HAVING TEMPERATURE
INSENSITIVE SPACER THEREIN
Robert Schept, Hennepin, Minn., assignor to Honeywell Inc., Minneapolis, Minn., a corporation of Delaware
Filed Dec. 7, 1965, Ser. No. 512,103
9 Claims. (Cl. 336—178)

The present invention pertains to magnetic cores. More particularly, the present invention pertains to magnetic core structures of the type where it is necessary to provide high reluctance gaps in the otherwise low reluctance magnetic path.

In magnetic core structures in which the low reluctance path is interrupted by high reluctance gap, such as air gap, the properties of the core are greatly affected by the dimenstions of the gap. It is, therefore, necessary for many applications to take steps which will assure accuracy in the gap dimensions and which will prevent a variation in the gap dimensions during the operation of the magnetic circuit of which the particular core structure is part.

Many factors affect the dimensions of a gap in a magnetic core. The most important of these, perhaps, is the effect of variations in temperature. Most materials of which the cores are made are greatly affected by temperature variations. Normally, as the temperature increases, the dimensions of the core increase correspondingly. This factor in itself would not have significant effect on the magnetic circuit operation if the dimension of the gap could be maintained constant. The present invention provides this feature. The structure disclosed has been designed specifically for application in nuclear magnetic resonance (NMR) devices, but will find application in any core structure with a gap, where the gap must be maintained constant and independent of any temperature variations. The result is acomplished by placing a fuzed quartz plate into the gap and providing movable pole pieces which are spring biased against the fuzed quartz plate. Fuzed quartz has an extremely small thermal coefficient and will therefore maintain the separation between the pole pieces effectively constant regardless of temperature variations. The rest of the core structure is free to expand or contract, but since the air gap constitutes the majority of the circuit reluctance, the flux density in the gap will remain constant.

It is, therefore, an object of the present invention to provide an improved magnetic core structure.

More particularly, it is an object of the present invention to provide magnetic core structure with high reluctance gaps, whose reluctance will not be affected by temperature variations.

These and further objects will become apparent to those skilled in the art upon examination of the following specification, claims, and drawing, in which:

Figure 1:
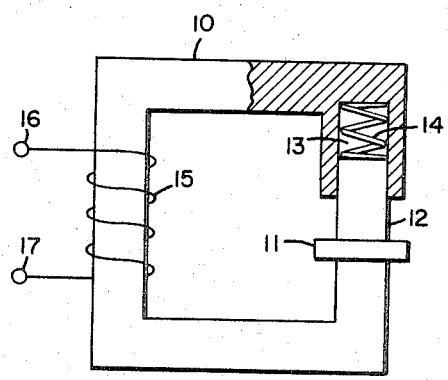
FIGURE 1 is a simple embodiment of the present invention.

Referring now to FIGURE 1, there is shown a C-shaped, low reluctance magnetic member 10. At the open end of the C-shaped member there is a fuzed quartz spacer 11 resting against one end of the C member. The other end of the C member has a cylindrical opening 13 in which rests a spring member 14 and a movable pole piece 12. The cross-sectional dimension of movable pole piece 12 is slightly smaller than the cylindrical opening. Pole piece 12 is inserted partially into the cylindrical opening such that the inward surface of pole piece 12 abuts against spring member 14 and somewhat compresses the spring member. The other, external end of pole piece 12 abuts against fuzed quartz spacer 11 and maintains spacer 11 at all times in intimate relationship with the one end of the C-shaped member on one side, and with pole piece 12 on the other side.

Core structure 10 also has a winding 15 connected between a pair of terminals 16 and 17.

Figure 3:
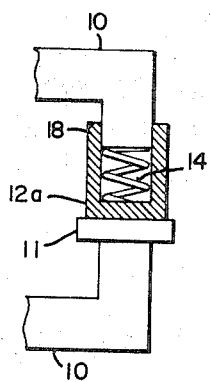
FIGURE 3 is an alternate embodiment of the apparatus of FIGURE 1.

FIGURE 3 illustrates an alternate embodiment. Rather than having a cylindrical opening in the main core member, the opening in pole piece 12 which fits in the form of a sleeve 18 over the end of member 10. Spring member 14 is positioned within sleeve 18, between member 10 and the internal wall of pole piece 12, to bias pole piece 12 outwardly toward spacer 11 which rests between pole piece 12 and the other end of member 10.

Figure 2:
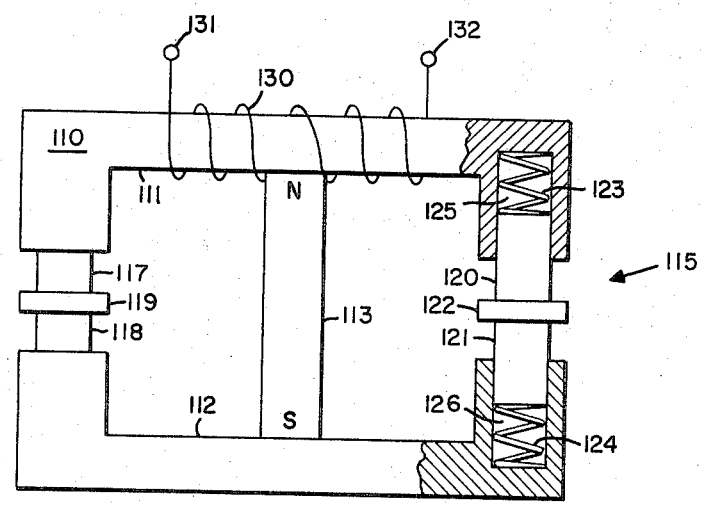
FIGURE 2 is a balanced core structure with two gaps, designed specifically for application in nuclear magnetic resonance devices.

FIGURE 2 shows the application of the present invention to the core structure of the type frequently employed in nuclear magnetic resonance devices such as illustrated in Patent 3,167,706, issued to B. Doyle, on Jan. 26, 1965. FIGURE 2 shows a magnetic core structure 110 comprised of two C-shaped magnetic members 111 and 112 of permeable magnetic material. A permanent bar magnet 113 is physically attached at its two ends respectively to midsections of members 111 and 112 to join the C-shaped members so as to provide two high reluctance gaps 114 and 115 between the ends of said members. The magnetic core structure described, forms a magnetic circuit with two loops, the two loops having a common leg formed by magnet 113, and each loop having a reluctance in the form of a gap in its low reluctance path. Permanent magnet 113 establishes bias magnetic flux of substantially equal magnitude in the two gaps 114 and 115.

Each end of the two C-shaped members has a slot within which is compressible spring member and a movable pole piece biased outwardly by said spring member. How these individual parts cooperate to form the structure of the present invention can be most easily seen by referring to the construction of gap 115 in FIGURE 2. Member 111 is shown at one of its ends to have a slot 125 within which rests a spring member 123. A movable pole piece 120 is also inserted in slot 125 and extends outwardly from slot 125. Member 112 has at one of its ends a slot 126 within which is a spring member 124. A movable pole piece 121 is inserted in slot 126 and extends outwardly from slot 126 along an axis which is common to the axis of movable piece 120 of member 111. Spring members 125 and 126 bias pole piece members 120 and 121 toward each other. The outward ends of pole pieces 120 and 121 are separated and kept apart by a fuzed quartz spacer 122 having a precise thickness dimension. Spacer 122 has high thermal stability and relatively high reluctance in comparison with the rest of the magnetic core structure. Pole piece members 120 and 121 are maintained firmly against spacer 122 by the action of springs 125 and 126. It can be seen that, within reasonable limits, no matter how the remainder of the core structure may expand or contract as a result of temperature variations or other factors, the separation between pole pieces 120 and 121 will remain substantially constant.

Gap 114 at the opposite side of core structure 110 is constructed in the same manner as gap 115. Telescoping pole pieces 117 and 118 are spring biased against a spacer 119 by spring means which are not shown but which are within members 111 and 112 in slots similar to slots 125 and 126.

The apparatus of the type shown in FIGURE 2 will find special application in the nuclear magnetic resonance device of the type illustrated in Patent 3,167,706, issued to B. Doyle, on Jan. 26, 1965. The sensitive element of the nuclear magnetic resonance device, which must be placed in the high reluctance gaps 114 and 115 may either be embodied in the solid structure of spacers 119 and 122 or a pocket may be provided in each of the spacers wherein the sensitive element may be placed. Input windings may be placed on core structure 110 in various ways as illustrated in the above referenced patent. In FIGURE 2, a winding 130 is shown wound about core structure 110 having its ends connected between input terminals 131 and 132, where an input signal may be applied.

Many variations and embodiments are possible within the spirit of the present invention. It is understood, therefore, that the specific embodiment shown is for the purpose of illustration only, and that my invention is limited only by the scope of the appended claims.

I claim:
1. A magnetic core structure comprising:
   a low reluctance magnetic member having a generally closed loop magnetic path interrupted by a gap;
   means provided at said gap for biasing the ends of said member in a direction tending to close said gap; and
   a relatively high reluctance, temperature insensitive, dimensionally stable spacer means positioned within said gap to maintain the ends of said member at a substantially constant separation.

2. Apparatus according to claim 1, wherein a plurality of gaps are provided in said magnetic member.

3. Apparatus as described in claim 1, wherein said spacer means is a fuzed quartz plate.

4. A closed loop, temperature insensitive, magnetic core structure comprising:
   a low reluctance member having a first and a second arm, the end of each arm facing the end of the other;
   a relatively high reluctance temperature insensitive, dimensionally stable spacer means positioned adjacent to the end of the first of said arms; and
   a low reluctance movable pole piece located between said spacer and the end of said second arm, said pole piece being spring loaded against said spacer means, said pole piece further being in low reluctance contact with said second arm of said member.

5. Apparatus according to claim 4, wherein said spacer means is a fuzed quartz plate.

6. A closed loop, magnetic core structure comprising:
   a low reluctance member having a first and a second arm, the end of each arm facing the end of the other;
   a relatively high reluctance, temperature insensitive, dimensionally stable spacer means positioned between the ends of said first and second arms; and
   a low reluctance movable pole piece located between said spacer means and each end of said arms, said pole piece being spring biased against said spacer means, said pole piece further being in low reluctance contact with respective arm of said member.

7. Apparatus according to claim 6, wherein said spacer means is a fuzed quartz plate.

8. A magnetic core structure with a plurality of gaps whose dimensions are precisely controlled and are independent of temperature variations, said structure comprising:
   a low reluctance member having a plurality of pairs of arms, the end of each arm of each pair facing the end of the other arm of said pair;
   a relatively high reluctance, temperature insensitive, dimensionally stable spacer means positioned between the two ends of the two arms of each pair;
   a movable, low reluctance pole piece positioned between the end of each of the two arms of each pair and said spacer means; and
   means for spring biasing each said pole piece against the respective spacer while maintaining each said pole piece in intimate low reluctance contact with the respective arms of said magnetic member.

9. Apparatus according to claim 8, wherein said spacer means is constructed of fuzed quartz.

References Cited

UNITED STATES PATENTS

| 1,891,481 | 12/1932 | Scofield | 336—179 |
| 1,910,957 | 5/1933 | Llewellyn | 336—179 |
| 2,568,485 | 9/1951 | Cage | 336—178 X |

LEWIS H. MYERS, *Primary Examiner.*

T. J. KOZMA, *Assistant Examiner.*